United States Patent
Bhandari et al.

(10) Patent No.: US 7,974,191 B2
(45) Date of Patent: Jul. 5, 2011

(54) METHOD, APPARATUS AND SYSTEM FOR THE SYNCHRONIZED COMBINING OF PACKET DATA

(75) Inventors: Rajan Bhandari, England (GB); Miguel Dajer, Succasunna, NJ (US); Mahendra Tailor, Harrow (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1616 days.

(21) Appl. No.: 10/797,916

(22) Filed: Mar. 10, 2004

(65) Prior Publication Data

US 2005/0201383 A1 Sep. 15, 2005

(51) Int. Cl.
*H04L 12/28* (2006.01)
*H04J 11/00* (2006.01)

(52) U.S. Cl. .................... 370/230; 370/208; 370/394

(58) Field of Classification Search .............. 370/254, 370/351, 389, 441, 442, 478, 230, 235, 394, 370/12, 260, 347, 106, 150, 229; 348/12; 375/260, 346, 150; 725/106

See application file for complete search history.

(56) References Cited

U.S. PATENT DOCUMENTS

| | | | |
|---|---|---|---|
| 4,899,335 A | 2/1990 | Johnson, Jr. et al. | |
| 5,757,767 A * | 5/1998 | Zehavi | 370/208 |
| 6,246,702 B1 | 6/2001 | Fellman et al. | |
| 6,262,976 B1 * | 7/2001 | McNamara | 370/254 |
| 6,275,990 B1 * | 8/2001 | Dapper et al. | 725/106 |
| 6,356,555 B1 * | 3/2002 | Rakib et al. | 370/441 |
| 6,680,955 B1 * | 1/2004 | Le | 370/477 |
| 2002/0105950 A1 * | 8/2002 | Dapper et al. | 370/386 |
| 2002/0143935 A1 * | 10/2002 | Schenkel et al. | 709/224 |
| 2002/0163932 A1 * | 11/2002 | Fischer et al. | 370/465 |
| 2003/0016770 A1 * | 1/2003 | Trans et al. | 375/346 |
| 2003/0214930 A1 * | 11/2003 | Fischer | 370/338 |
| 2004/0228393 A1 * | 11/2004 | Chen et al. | 375/150 |
| 2005/0216616 A1 * | 9/2005 | Eldar et al. | 710/52 |

FOREIGN PATENT DOCUMENTS

| | | |
|---|---|---|
| CA | 2 290 265 A1 | 5/2001 |
| WO | WO 03/107609 A | 12/2003 |

OTHER PUBLICATIONS

JP Kokai Patent App No. Hei 1 [1998]-175431, Jul. 11, 1989, Tsutomu Murase.

* cited by examiner

*Primary Examiner* — Jianye Wu
(74) *Attorney, Agent, or Firm* — Wall & Tong, LLP

(57) ABSTRACT

A method, apparatus and system for the synchronized combining of packet data in a network includes sorting data packets received during a predetermined time period into groups according to for which communications device of the network the received data packets are intended. The data packets in each of the groups intended for the respective communications devices are respectively time aligned and orthogonally combined. The respectively combined data packets intended for each of the specific communications devices are subsequently transmitted to the intended device using a single header and in a substantially compressed format.

21 Claims, 6 Drawing Sheets

METHOD, APPARATUS AND SYSTEM FOR THE SYNCHRONIZED COMBINING OF PACKET DATA

FIELD OF THE INVENTION

This invention relates to the field of data communication and, more specifically, to the synchronized combining of data in packet networks.

BACKGROUND OF THE INVENTION

A network is a communications facility that permits a number of workstations, computers or other equipment (hereinafter collectively "computer(s)") to communicate with each other. Portions of a network involve hardware and software, for example, the computers or stations (which individually may comprise one or more central processing units, random access and persistent memory), the interface components, the cable or fiber optics used to connect them, as well as software that governs the access to and flow of information over the network. In a network, network architecture defines protocols, message formats and other standards to which the computers and other equipment, and software must adhere.

The physical transmission of data in a packet network is typically ensured using carrier sensing to defer transmission until the network is clear. In brief, a transmitting station (e.g., computer or user 10) listens or monitors the transmission medium (e.g., cable 20) before transmitting to determine whether another station (e.g., computer or user 10') is currently transmitting a message, e.g., to learn whether the medium is free. For example, media access management determines whether the transmission medium (or carrier) is presently being used. If the medium is not being used, the data frame is approved for transmission. Even after transmission of the frame has begun, the carrier is monitored. While the carrier is busy, the carrier is continuously monitored until no other stations are transmitting. A specified random period of time is allowed after determining that no other stations are transmitting for the network to clear before beginning transmission.

However, other station(s) having messages to send may all listen simultaneously, discern that the transmission medium appears quiet, and begin to transmit messages simultaneously, for example to a common station. The result is a collision and garbled messages. If signal collision is detected, receiving stations ignore the garbled transmission and transmitting stations stop transmitting messages immediately and transmit a jamming signal over the medium. Following collision, each transmitting station will attempt to re-transmit after waiting for a random backoff-delay time period for the carrier to clear. Thus, a station transmitting must listen sufficiently long to ensure that collision has not occurred. Such systems, however, may result in long latency times for the delivery of data packets and do not optimally use the available system bandwidth. What is needed in the art is a means for reducing the latency times of at least data packets intended for a common terminal and for improving the use of available system bandwidth.

SUMMARY OF THE INVENTION

The present invention solves the deficiencies of the prior art by providing a method, apparatus and system for the synchronized combining of packet data intended for a common receiving station.

In one embodiment of the present invention, a method in a packet network for combining data intended for a common communications device includes sorting the data packets received during a predetermined-time period into groups according to for which communications device of the network the received data packets are intended. The method further includes respectively time aligning the data packets in each of the groups and orthogonally combining the sorted and time aligned data packets within each group. The combined data packets intended for a specific communications device are subsequently transmitted to the device using a single header and in a substantially compressed format. More specifically, the bandwidth required for the transmission of the combined data packets is substantially equal to the bandwidth that would be required to transmit the largest data packet within the respective group of data packets intended for a particular communications device.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method, apparatus and system for the synchronized combining of services, for example data packets, intended for a common communications device. Although various embodiments of the present invention are described herein with respect to combining data packets in a specific packet network intended for specific terminals, the specific embodiments of the present invention should not be treated as limiting the scope of the invention. It will be appreciated by those skilled in the art informed by the teachings of the present invention that the concepts of the present invention may be advantageously applied in substantially any network for synchronizing and combining services intended for a communications device.

Figure 1:
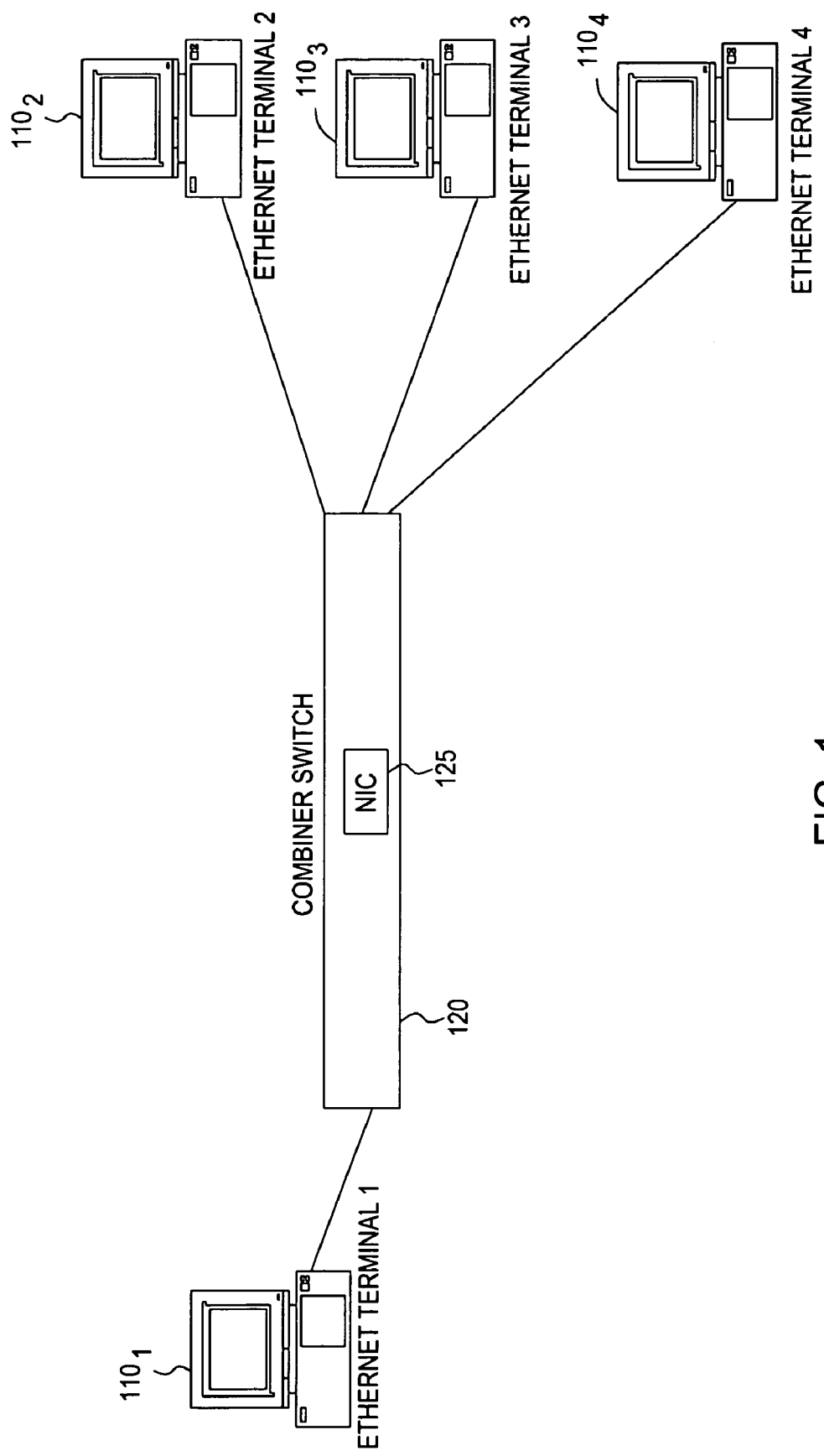
FIG. 1 depicts a high level block diagram of a packet network including synchronized packet combining and routing in accordance with an embodiment of the present invention.

FIG. 1 depicts a high level block diagram of a packet network including synchronized packet combining and routing in accordance with an embodiment of the present invention. The packet network 100 of FIG. 1 illustratively comprises four terminals (illustratively Ethernet terminals) $110_1$-$110_4$ and an embodiment of a combiner switch 120 in accordance with the present invention. In the packet network 100 of FIG. 1, the combiner switch 120 further comprises a novel network interface controller 125 in accordance with an embodiment of the present invention.

Figure 2:
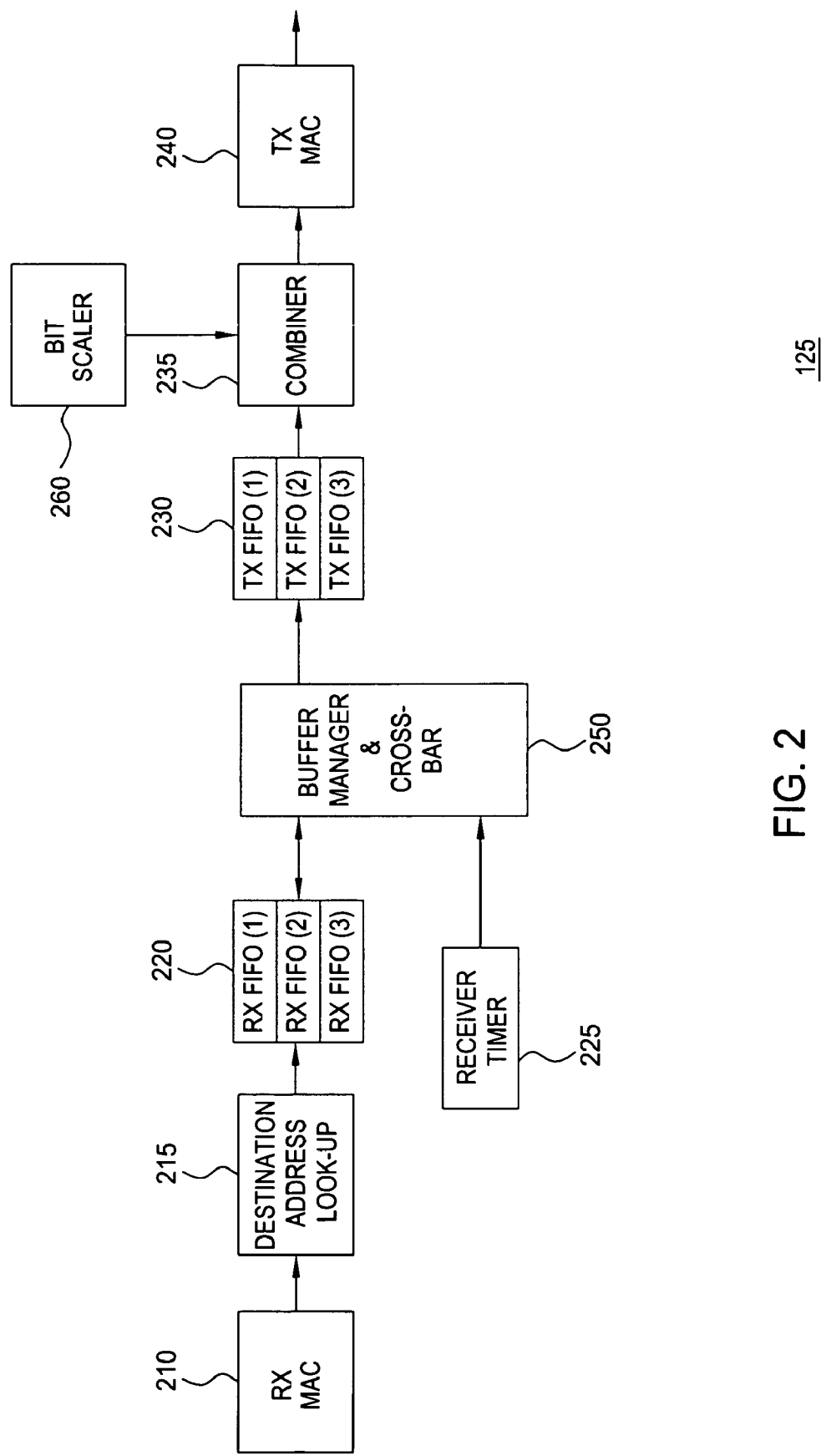
FIG. 2 depicts a high level block diagram of an embodiment of a network interface controller suitable for use in a combiner switch of the packet network of FIG. 1.

FIG. 2 depicts a high level block diagram of an embodiment of a network interface controller suitable for use in the combiner switch 120 of the packet network 100 of FIG. 1. The network interface controller 125 of FIG. 2 illustratively comprises a Receive portion and a Transmit portion. The Receive portion of the of the network interface controller 125 of FIG. 2 illustratively comprises a Receive MAC 210, a destination address look-up table (illustratively a filter) 215, a Receive Data first-in-first-out (FIFO) memory 220, and a Receive Timer 225. The Transmit portion of the network interface controller 125 of FIG. 2 illustratively comprises a Transmit Data first-in-first-out (FIFO) memory 230, a combiner circuit 235, and a Transmit MAC 240. The network interface controller 125 of FIG. 2 further comprises a Buffer Manager/Crossbar 250, and an optional Bit Scaling circuit 260.

Figure 3:
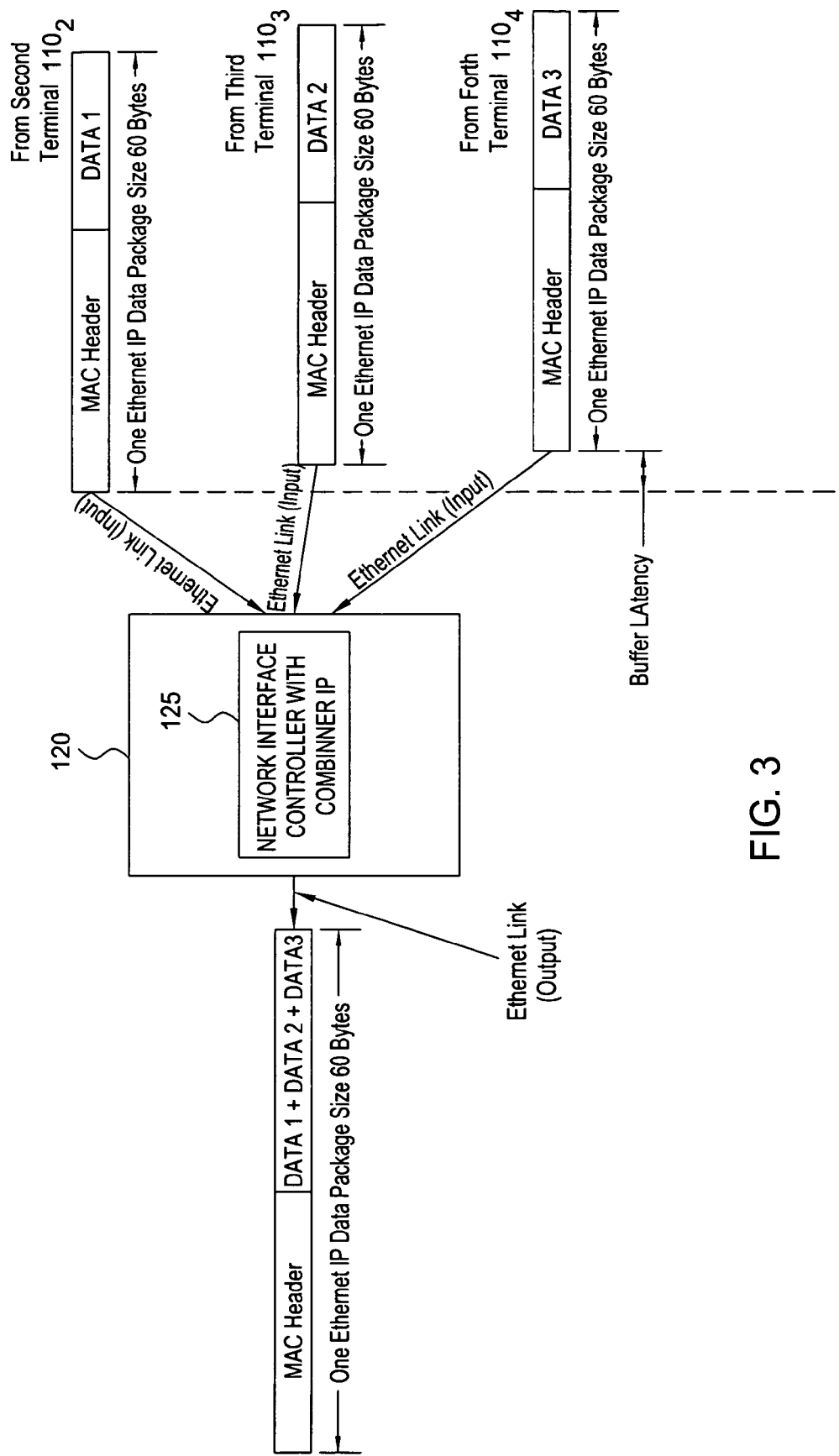
FIG. 3 depicts a timing diagram depicting the transmission of a data packet from each of the second, third and fourth terminals to the first terminal through the combiner switch of the packet network of FIG. 1.

In accordance with the concepts of the present invention, data packets from a plurality of terminals intended for a common terminal are orthogonally combined such that they are communicated to the common terminal with a single header and in a combined format. For example, in the packet network 100 of FIG. 1, the second, third and fourth terminals $110_2$-$110_4$ each transmit a data packet intended for the first terminal $110_1$ to the combiner switch 120. FIG. 3 depicts a timing diagram depicting the transmission of a data packet from each of the second, third and fourth terminals $110_2$-$110_4$ to the first terminal $110_1$ through the combiner switch 120. Each of the data packets from the second, third and fourth terminals $110_2$-$110_4$ intended for the first terminal $110_1$ illustratively comprise a MAC header section and a data section equaling a total of 60 bytes. As depicted in FIG. 3, the data packets from each of the second, third and fourth terminals $110_2$-$110_4$ may not arrive at the combiner switch 120 at the same time because of, for example, differences in the latencies of the transmission media of the four terminals $110_2$-$110_4$. As such, when a data packet is received by the switch 120 for an intended terminal, for example the first terminal $110_1$, the received data is buffered in the combiner switch 120 for a predetermined period of time in order for other data packets intended for the receiving terminal, for example the first terminal $110_1$, to reach the combiner switch 120.

More specifically, when a data packet is transmitted from, for example the second terminal $110_2$, intended for, for example, the first terminal $110_1$, the data packet is routed through the combiner switch 120. The Receive MAC 210 of the network interface controller 125 of the combiner switch 120 determines the destination of the data packet from the MAC header and subsequently communicates the data packet to the destination address look-up filter 215. In the destination address look-up filter 215, the destination address of the received data packet is used to locate the received data packet in a specific location of the Receive Data FIFO 220. Each location of the Receive Data FIFO 220 is subsequently used to switch a received data packet to a corresponding location of the Transmit Data FIFO 230 (described below). The received data packet is maintained in the Receive Data FIFO 220 until the expiration of the Receive timer 225. That is, the Receive timer 225 begins counting (i.e., is reset) upon the receipt of the first data packet. The Receive timer 225 continues to count for a predetermined amount of time during which other data packets may be received by the combiner switch 120. The value of the Receive timer 225 may be programmed by a user or may be dynamically controlled by information found in a header of a received data packet. For example, a received data packet may contain timing information in its header to configure the Receive timer 225 to count for a predetermined period of time to allow, for example, synchronized data packets intended for a common terminal to reach the combiner switch 120.

If during the counting of the Receive timer 225 a second data packet intended for the first terminal $110_1$ is received from, for example, the third terminal $110_3$, the destination of the data packet, in this example the first terminal $110_1$, is determined by the Receive MAC 210. Once again the received data packet is communicated to the destination address look-up filter 215. In the destination address look-up filter 215, the destination address of the received data packet is used to store this second received data packet in a specific location of the Receive Data FIFO 220. The second data packet is stored in the Receive Data FIFO 220 in a corresponding location as the first received data packet since the two received data packets are destined for the same terminal, in this example the first terminal $110_1$. Likewise and referring to FIG. 3, when a third data packet intended for the first terminal $110_1$ is received from, for example, the fourth terminal $110_4$, once again the destination of the data packet, in this example the first terminal $110_1$, is determined by the Receive MAC 210. The received data packet is communicated to the destination address look-up filter 215. In the destination address look-up filter 215, the destination address of the received data packet is used to store this third data packet in a specific location of the Receive Data FIFO 220. The third data packet is stored in the Receive Data FIFO 220 in a corresponding location as the first and second received data packets since the three data packets are destined for the same terminal, in this example the first terminal $110_1$.

In the packet network 100 of FIG. 1, the Receive Data FIFO 220 is illustratively divided into a plurality of sections. Each of the sections of the Receive Data FIFO 220 may correspond to a respective section of the Transmit Data FIFO 230. For example, when the Receive Timer 225 expires, data packets stored in a first section of the Receive Data FIFO 220 are communicated across the Buffer Manager/Crossbar 250 and communicated to, for example, a first section of the Transmit Data FIFO 230, which, in this example, is used for storing data packets intended for the first terminal $110_1$. The data packets maintained in the first section of the Transmit Data FIFO 320 are subsequently combined (described below) and transmitted as a single data packet to an intended terminal, in this example the first terminal $110_1$.

Although in FIG. 2, the network interface controller 125 is depicted as comprising a Receive Data FIFO 220 and a Transmit DATA FIFO 230 comprising a plurality of physical slots, in alternate embodiments of the present invention, a Receive Data FIFO 220 and a Transmit DATA FIFO 230 of the present invention may be formatted in software and controlled to arrange data packets in the FIFOs such that they are distinguishable as described above, yet not necessarily maintained in different physical slots.

The Buffer Manager/Crossbar 250 removes the latency between the arrivals of the data packets to the combiner switch 120. More specifically, the Buffer Manager/Crossbar 250 buffers received data to align the phases of the data for subsequent combining by the combiner circuit 235 of the combiner switch 120. The latency between the data packets received by the combiner switch 120 for an intended terminal should be limited to an amount of time capable of being counted by the Receive Timer 225 and removed by the Buffer Manager/Crossbar 250.

For example, in various embodiments of the present invention, the combiner switch 120 of the present invention is implemented in a synchronized network. That is, in a synchronized network, the latency of data packets to be transmitted is known because the communication of data is accomplished according to a global timing schedule. As such, the latency of a plurality of data packets intended for a specific terminal is determinable and a Receive timer and a Buffer Manager/Crossbar of a combiner switch of the present invention may be configured such that an included Receive timer expires after a maximum known latency for data packets intended for a destination terminal and an included Buffer Manager/Crossbar is adapted to remove the latency between received data packets up to the maximum known latency by causing the data packets in the Receive Data FIFO 220 to be communicated to the Transmit Data FIFO 230 only after the expiration of the Receive timer 225.

Referring back to FIG. 3 and as disclosed above, the three data packets stored in the first section of the Receive Data FIFO 220 are communicated to a corresponding first section of the Transmit Data FIFO 230. The stored data packets are subsequently communicated to the combiner circuit 235 where the data packets are orthogonally combined. The orthogonally combined data packets are then transmitted to the first terminal $110_1$ as a single data packet with a common MAC header. More specifically, each of the data packets are orthogonally encoded and transmitted with a single header to the intended terminal, in this example the first terminal $110_1$. The optional Bit Scaling circuit 260 of the network interface controller 125 of the packet network 100 of FIG. 1 is implemented for defining the number of bits to be combined by the combiner circuit 235.

In one embodiment of the present invention, the orthogonal encoding/combining is accomplished by receiving a plurality of data packets, or encoded data packets, in parallel and applying at least one pre-selected orthogonal function to each of the received data packets. This produces orthogonally covered data packets. The parallel data packets are each mapped into an orthogonally encoded and combined output data stream by the combiner circuit 235. In one embodiment of the present invention, the combiner circuit 235 comprises a fast Hadamard Transformer for applying the orthogonal coding and combining the data packets. A means of such encoding and combining is generally described in U.S. Pat. No. 5,757,767, issued May 26, 1998 to Zehavi, which is herein incorporated by reference in its entirety. Although a specific example of orthogonal combining is disclosed above for this embodiment of the present invention, various methods and techniques are known in the art for orthogonally combining data packets and, as such, substantially any of such known methods and techniques may be applied within the concepts of the present invention for alternate embodiments of the present invention.

One advantage for the synchronized combining of data packets in accordance with the concepts of the present invention is to reduce the amount of bandwidth needed to communicate the various data packets received for an intended terminal during a specific time period to that terminal. For example and as depicted in FIG. 3, each of the respective data packets transmitted by the second, the third and the fourth terminals $110_2$-$110_4$ includes a MAC header and data comprising a total of 60 bytes. As also depicted in FIG. 3 however, the orthogonally combined data packet transmitted to the first terminal $110_1$ also includes a single MAC header and data comprising a total of 60 bytes. As such, it is evident from at least the embodiment of FIG. 3 described above that, in various embodiments of the present invention, it is an intention of the present invention to reduce the bandwidth necessary to transmit data packets received during a predetermined time interval intended for a common terminal to that terminal. If during the combining of the various received data packets an overflow condition occurs, an error message is communicated to, for example a system controller (not shown) or alternatively to the Bit Scaling circuit 260 of the network interface controller 125 to indicate the overflow to, for example, adjust the level of bit scaling to correct for the overflow condition.

In the packet network 100 of the present invention, data packets received by the combiner switch 120 intended for a different terminal, for example the second terminal $110_2$, during a time period of the Receive Timer 225 configured for the reception of data packets intended for another specific terminal, in the example above the first terminal $110_1$, may be stored in a separate section of the Receive Data FIFO 220 for subsequent possible combination and transmission with other received data packets intended for a common terminal, for example, the second terminal $110_2$. Alternatively, data packets not to be combined (i.e., data packets received and destined for a terminal other than a terminal to receive combined data packets during a specific time interval) may be handled by the combiner switch 120 of the present invention according to conventional protocols (i.e., in IP packet networks data packets not to be combined are communicated in the network according to convention Ethernet protocols).

In various embodiments of the present invention, a network, such as the packet network 100 of FIG. 1, may be configured for only particular data packets having specific addresses to be combined by a combiner switch of the present invention. In such embodiments, a destination address look-up table of a combiner switch of the present invention is configure to store the desired addresses to be combined and upon receiving a data packet, a combiner switch of the present invention examines the header of the received data packets as disclosed above and combines those data packets having the predetermined addresses as disclosed above. In such embodiments of the present invention, data packets received whose address is not found in the destination address look-up table may be substantially immediately communicated to the Transmit side of a combiner switch of the present invention for transmission during the first available opportunity. More specifically, in embodiments of the present invention data packets not to be combined are transmitted by the combiner switch of the present invention according to convention Ethernet protocols.

Although in the network terminal 125 of FIG. 2 the number of sections of the Receive Data FIFO 220 and the Transmit Data FIFO 320 are illustratively equal, in alternate embodiments of the present invention the number of sections do not have to be equal. That is, in alternate embodiments of the present invention, data packets stored in a section of a Receive Data FIFO intended for a specific terminal may be communicated to and stored in more than one section of a Transmit Data FIFO. Similarly, data packets stored in more than one section of the Receive Data FIFO intended for a specific terminal may be communicated to and stored in a single section of the Transmit Data FIFO. Likewise, data packets stored in sections of the Receive Data FIFO intended for a specific terminal may be communicated and stored in substantially any section or sections of the Transmit Data FIFO and not necessarily a respectively numbered section. An important aspect of the present invention is that multiple data packets intended for a specific terminal are stored such that those data packets are distinguishable from data packets intended for another terminal.

Figure 4:
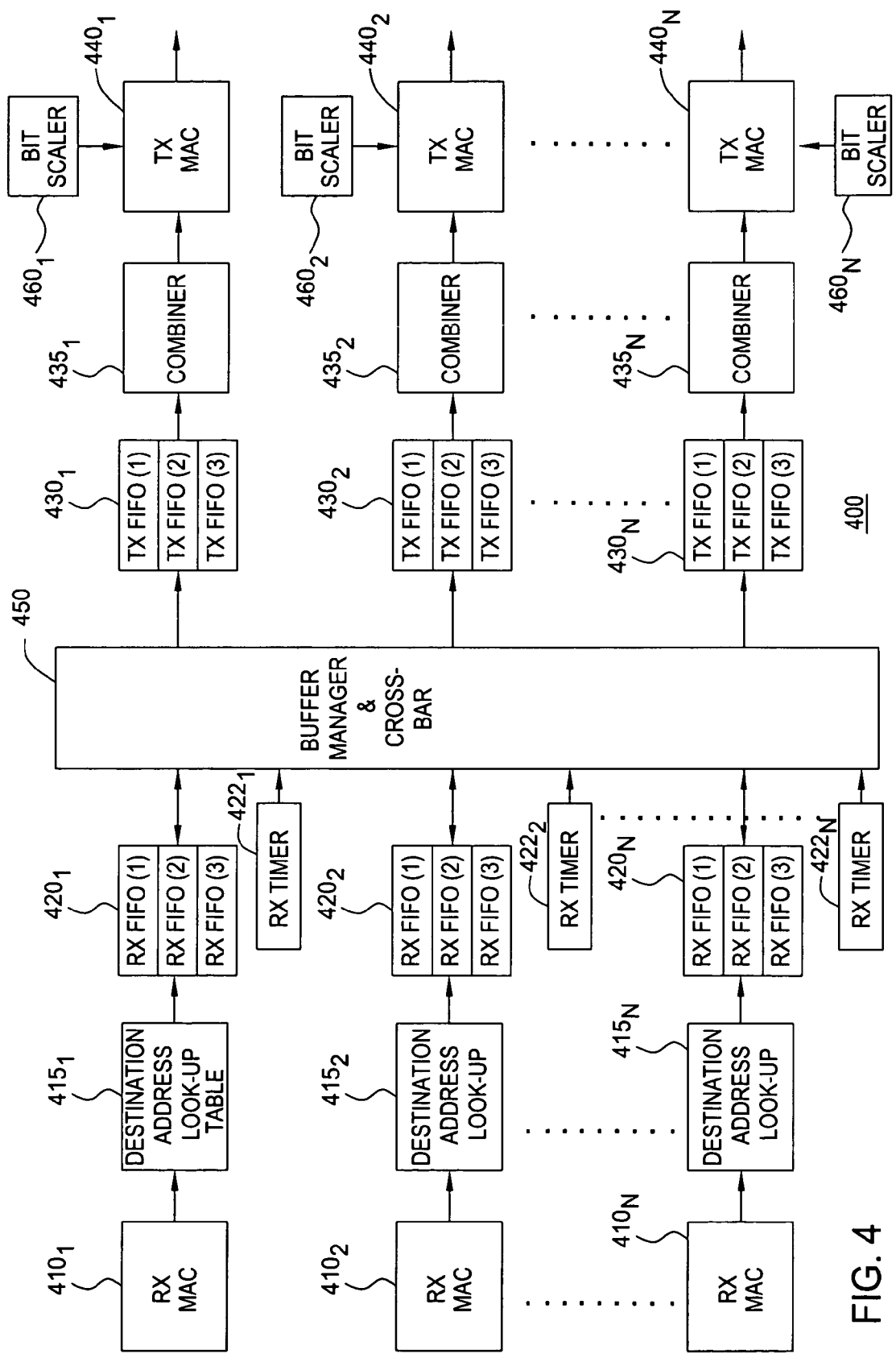
FIG. 4 depicts a high level block diagram of an alternate embodiment of a combiner switch having a novel network interface controller suitable for use in the packet network of FIG. 1.

Although in the packet network 100 of FIG. 2, an embodiment of a combiner switch of the present invention was illustrated and described as comprising a single Receive MAC and a single Transmit MAC it will be appreciated by those skilled in the art informed by the teachings of the present invention that such a combiner switch may comprise substantially any number and combination of Receive sections and Transmit sections as described above. For example, FIG. 4 depicts a high level block diagram of an alternate embodiment of a combiner switch 400 having a novel network interface controller 425 suitable for use in the packet network 100 of FIG. 1 in accordance with the present invention. The network interface controller 425 of the combiner switch 400 illustratively comprises a Receive portion having a plurality of receive paths and a transmit portion having a plurality of transmit paths. The Receive portion of the of the network interface controller 425 of FIG. 4 illustratively comprises a plurality of Receive MACs $410_1$-$410_N$, a plurality of destination address look-up tables $415_1$-$415_N$, a plurality of Receive Data FIFOs $420_1$-$420_N$, and a plurality of Receive Timers $422_1$-$422_N$. The Transmit portion of the network interface controller 425 of FIG. 4 illustratively comprises a plurality of Transmit Data FIFOs $430_1$-$430_N$, a plurality of combiner circuits $435_1$-$435_N$, and a plurality of Transmit MACs $440_1$-$440_N$. The network interface controller 425 of FIG. 4 further comprises a Buffer Manager/Crossbar 450, and optional Bit Scaling circuits $460_1$-$460_N$. In the network interface controller 425 of FIG. 4 one of each of the components listed above comprise separate communication paths for the network interface controller 425.

In accordance with the concepts of the present invention, data packets from a plurality of terminals received by the various Receiver MACs 410 of the combiner switch 400 intended for a common terminal are orthogonally combined such that they are communicated to the common terminal with a single header and in a combined format. For example and as described above, in the packet network 100 of FIG. 1, the second, third and fourth terminals $110_2$-$110_4$ each transmit a data packet intended for the first terminal $110_1$ to the combiner switch 120. As disclosed above, the received data is buffered in the combiner switch 120 for a predetermined period of time in order for other data packets intended for the receiving terminal to reach the combiner switch 120. The combiner switch 400 and accordingly the network interface controller 425 of FIG. 4 operates in substantially the same manner as the combiner switch 120 and accordingly the network interface controller 125 described above, with the exception that the combiner switch 400 of FIG. 4 may receive data intended for a specific terminal via different inputs (Receive MACs).

More specifically, when data packets are received at different input paths of the combiner switch 400 from, for example, the second, third and fourth terminals $110_2$-$110_4$, a Receive MAC 410 in each of the receive paths of the network interface controller 425 determines the destination, in this example the first terminal $110_1$, of the data packets using a respective MAC header of each of the received data packets. Each of the data packets are subsequently communicated to a respective destination address look-up table 415 in the respective receiver path. In the destination address look-up tables 415, the destination address of the received data packets are used to locate the received data packets in a specific location of a respective Receive Data FIFO 420. That specific location of the respective Receive Data FIFOs 420 are subsequently used to switch the received data packets intended for the first terminal $110_1$ to a corresponding location of a Transmit Data FIFO 430 located in the Transmit portion of the network interface controller 425 configured to store data packets intended for the first terminal $110_1$. However and as described above, the received data packets are maintained in the respective Receive Data FIFOs 420 until the expiration of a Receive timer 422 configured to allow a specific amount of time for data packets to be received for the first terminal $110_1$ as described above. For example, data packets received by the first Receive MAC $410_1$, the second Receive MAC $410_2$ and the third Receive MAC $410_3$ of the network interface controller 425 intended for the first terminal $110_1$ are respectively communicated to the first destination look-up table $415_1$, the second destination look-up table $415_2$ and the third destination look-up table $415_3$. In each of the respective destination address look-up tables 415, the destination address of the received data packets are used to locate the received data packets in a specific location of a respective Receive Data FIFO, in this example Receive Data FIFO $420_1$, $420_2$ and $420_3$. That specific location of the respective Receive Data FIFOs 420 are subsequently used to switch the received data packets intended for the first terminal $110_1$ to a corresponding location of a Transmit Data FIFO, for example, Transmit Data FIFO $430_1$. In the illustrated embodiment of FIG. 4, the first Transmit Data FIFO $430_1$, is used to store data packets to be combined by the first combiner circuit $435_1$ and transmitted to the first terminal $410_1$.

If during the counting of the Receive timer $422_1$ a data packet intended for a terminal other than the first terminal $110_1$, for example the second terminal $110_2$, is received by, for example, the first Receive MAC $410_1$, the received data packet is communicated to the first destination look-up table $415_1$. In the destination address look-up table $415_1$, the destination address of the received data packet is used to store this data packet received for the second terminal $410_2$ in a second section of the Receive Data FIFO $420_1$ of the first path. The second section of the Receive Data FIFO $420_1$, in this example, is used to store data packets intended for the second terminal $410_2$. Likewise, data packets received in the first path intended for the third terminal $410_3$ are stored in a third section of the Receive Data FIFO $420_1$ of the first path and so on. Data packets received in other paths of the network interface controller 425 are similarly stored in respective sections of Receive Data FIFOs and transmitted to respective Transmit Data FIFOs, as described above, to be combined by respective combiner circuits and transmitted to intended terminals. For example, the Transmit Data FIFO $430_1$ in the first path may be configured to store data packets to be combined and transmitted to the first terminal $410_1$, the Transmit Data FIFO $430_2$ in the second path may be configured to store data packets to be combined and transmitted to the second terminal $410_2$ and so on. In the network interface controller 425, the Receive Data FIFOs 420 are illustratively divided into a plurality of sections. Each of the sections of the Receive Data FIFOs 420 may correspond to a respective Transmit Data FIFO 430 for transmission of data to a respective terminal.

Although in FIG. 4, the network interface controller 425 is depicted as comprising Receive Data FIFOs 420 and Transmit DATA FIFOs 430 comprising a plurality of physical slots, in alternate embodiments of the present invention, the Receive Data FIFOs 420 and the Transmit DATA FIFOs 430 of the present invention may be formatted in software and controlled to arrange data packets in the FIFOs such that they are distinguishable as described above, yet not necessarily maintained in different physical slots.

Figure 5:
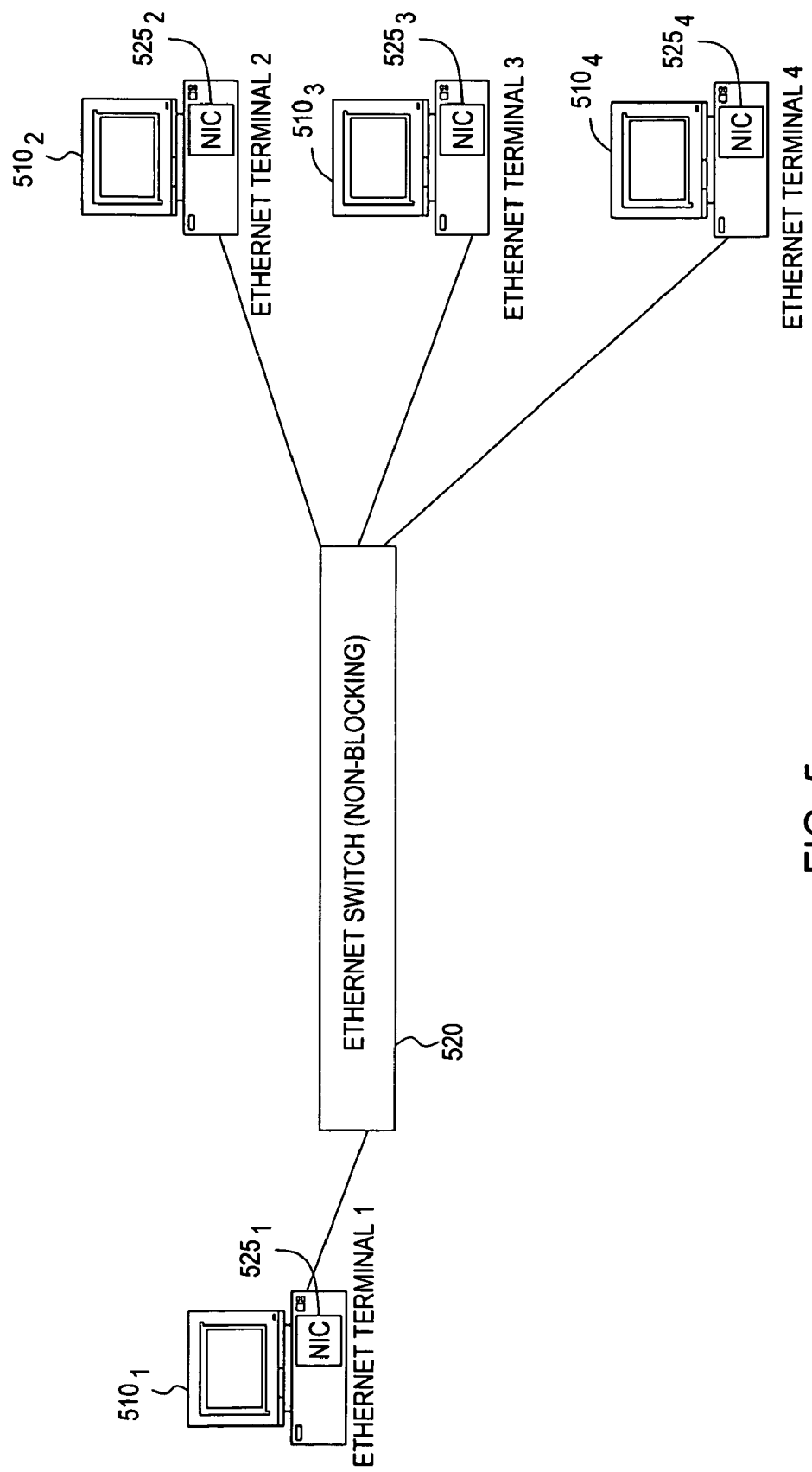
FIG. 5 depicts a high level block diagram of a packet network including synchronized packet combining and routing in the network terminals in accordance with an alternate embodiment of the present invention.

In alternate embodiments of the present invention a network interface controller such as the network interface controller of FIG. 2 and FIG. 4 may be implemented in network terminals to perform the combining and transmitting of data packets in accordance with the present invention. For example, FIG. 5 depicts a high level block diagram of a packet network including synchronized packet combining and routing in the network terminals in accordance with an alternate embodiment of the present invention. The packet network 500 of FIG. 5 illustratively comprises four terminals (illustratively Ethernet terminals) $510_1$-$510_4$ and a non-blocking switch 520. In the packet network 500 of FIG. 5, each of the terminals $510_1$-$510_4$ further comprises a respective network interface controller $525_1$-$525_4$ in accordance with an embodiment of the present invention.

Figure 6:
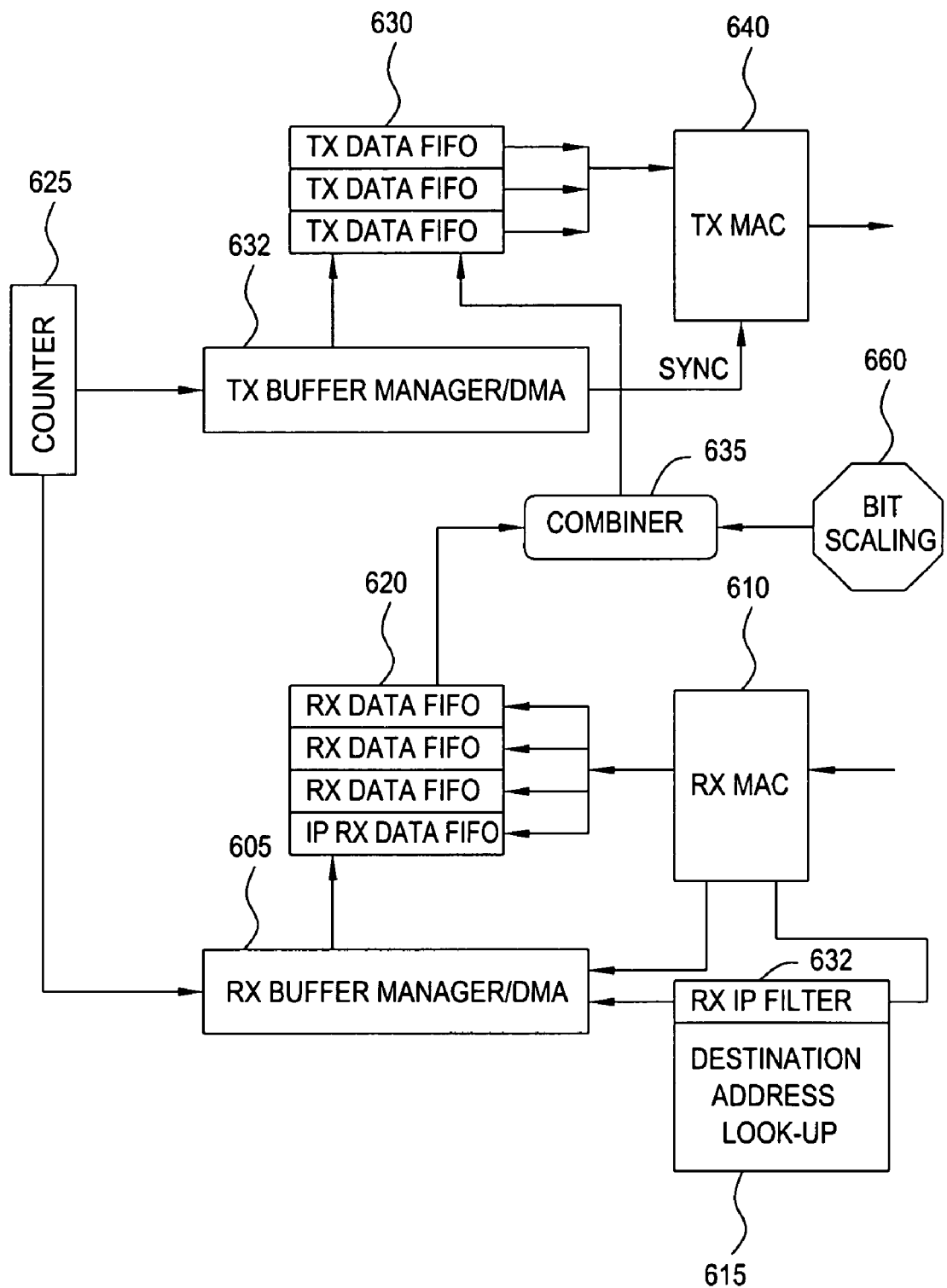
FIG. 6 depicts a high level block diagram of an embodiment of a network interface controller suitable for use in each of the terminals of the packet network of FIG. 5.

FIG. 6 depicts a high level block diagram of an embodiment of a network interface controller 525 suitable for use in each of the terminals $510_1$-$510_4$ of the packet network 500 of FIG. 5. Because each of the interface controllers $525_1$-$525_4$ of the terminals $510_1$-$510_4$ is substantially the same, the network interface controller 525 of FIG. 6 should be considered representative of each of the interface controllers $525_1$-$525_4$ of the terminals $510_1$-$510_4$ of the packet network of FIG. 5. The network interface controller 525 of FIG. 6 illustratively comprises a Receive portion and a Transmit portion. The Receive portion of the of the network interface controller 525 of FIG. 6 illustratively comprises a Receive MAC 610, a Receive Buffer Manager/DMA 605, a Receive data FIFO 620, a destination address look-up table 615, and a Receive filter 622. The Transmit portion of the network interface controller 525 of FIG. 6 illustratively comprises a Transmit Data FIFO 630, a Transmit Buffer Manager/DMA 632, a combiner circuit 635, and a Transmit MAC 640. The network interface controller 525 of FIG. 6 further comprises a counter 625 and an optional Bit Scaling circuit 660.

The network interface controllers $525_1$-$525_4$ of the terminals $510_1$-$510_4$ of the packet network of FIG. 5 function in substantially the same manner as the network interface controller 125 of the combiner switch 120 of the packet network 100 of FIG. 1. More specifically, in accordance with the concepts of the present invention, data packets received by a terminal intended for a common terminal are orthogonally combined such that they are communicated to the common terminal with a single header and in a combined format. For example, in the packet network 500 of FIG. 5, a data packet received by, for example, the first terminal $510_1$ intended for, for example, the second terminal $510_2$ is received by the Receive MAC 610. The Receive MAC 610 of the network interface controller $525_1$ of the first terminal $510_1$ determines the destination of the data packet from the MAC header and subsequently communicates the data packet to the destination address look-up table 615. In the destination address look-up table 615, the destination address of the received data packet is used to locate the received data packet in a specific location of the Receive Data FIFO 620. As disclosed above, each section of the Receive Data FIFO 620 is subsequently used to switch a received data packet to a corresponding location of the Transmit Data FIFO 630.

The received data packet is maintained in the Receive Data FIFO 620 until the expiration of a predetermined number of counts by the counter 625. That is, the counter 625 begins counting (i.e., is reset) upon the receipt of the first data packet. The counter 625 continues to count for a predetermined number of counts during which other data packets may be received by the first terminal $510_1$. The value of the counter 625 may be programmed by a user or may be dynamically controlled by information found in a header of a received data packet. For example, a received data packet may contain timing information in its header to configure the counter 625 to count a predetermined number of counts to allow, for example, synchronized data packets intended for a common terminal to reach the first terminal $510_1$.

If during the counting of the counter 625 a second data packet intended for the second terminal $510_2$ is received by the first terminal $510_1$, the destination of the data packet is again determined by the Receive MAC 610. Once again the received data packet is communicated to the destination address look-up table 615. In the destination address look-up table 615, the destination address of the received data packet is used to store this second received data packet in a specific section of the Receive Data FIFO 620. The second data packet is stored in the Receive Data FIFO 620 in a corresponding location as the first received data packet since the two received data packets are destined for the same terminal, in this example the second terminal $510_2$. However, data packets received by, for example, the first terminal $510_1$, intended for another common terminal may not arrive at the first terminal $510_1$ at the same time because of, for example, differences in the latencies of the transmission media of the transmitting devices. As such, when a data packet is received by the first terminal $510_1$ for an intended common terminal, for example the second terminal $110_2$, the received data is buffered in the Receive Data FIFO 620 for a predetermined amount of time (i.e., a specific number of counts) in order for other data packets intended for a common terminal, for example the second terminal $510_2$, to be received by the first terminal $510_1$.

In various embodiments of the present invention, the network interface controller 525 and network terminal of the present invention is implemented in a synchronized network. That is, in a synchronized network, the latency of data packets to be transmitted is known because the communication of data is accomplished according to a global timing schedule. As such, the latency of a plurality of data packets intended for a specific terminal is determinable and a number of predetermined counts for a counter and a buffer time for Receive Data FIFO for a terminal of the present invention may be configured such that an included count number is configured to represent a maximum known latency for data packets intended for a destination terminal and a buffer time is configured to remove the latency between received data packets up to the maximum known latency.

In the packet network 500 of FIG. 5, the Receive Data FIFO 620 is illustratively divided into a plurality of sections. Each of the sections of the Receive Data FIFO 620 may correspond to a respective section of the Transmit Data FIFO 630. When the predetermined number of counts is counted by the counter 625, data packets stored in a first section of the Receive Data FIFO 620 are communicated by the Receive Buffer Manager/DMA 605 to the combiner circuit 635. In the combiner circuit 635, the data packets are orthogonally combined as described above. The optional Bit Scaling circuit 660 of the network interface controller 525 is implemented for defining a number of bits to be combined by the combiner circuit 635.

After combining, the respective received data packets intended for, in this example, the second terminal $510_2$ are communicated to a corresponding section of the Transmit Data FIFO 630. For example, after being combined the data packets are stored in, for example, a second section of the Transmit Data FIFO 630, which, in this example, is used for storing data packets intended for the second terminal $510_2$. The combined data packets are then subsequently transmitted to the second terminal $510_2$. Each of the terminals $510_1$-$510_4$ of the packet network 500 of FIG. 5 operate in the same manner for respective received data packets to be transmitted to a common terminal.

Although in FIG. 6, the network interface controller 525 is depicted as comprising a Receive Data FIFO 620 and a Transmit DATA FIFO 630 comprising a plurality of physical slots, in alternate embodiments of the present invention, a Receive Data FIFO 620 and a Transmit DATA FIFO 630 of the present invention may be formatted in software and controlled to arrange data packets in the FIFOs such that they are distinguishable as described above, yet not necessarily maintained in different physical slots.

In various embodiments of the present invention, a network, such as the packet network 500 of FIG. 5, may be configured for only particular data packets having specific addresses to be combined by a combiner switch of the present invention. In such embodiments, a destination address lookup table of a network terminal of the present invention is configure to store the desired addresses to be combined and upon receiving a data packet, a receiving terminal examines the header of the received data packets as disclosed above and combines those data packets having the predetermined addresses as disclosed above. In such embodiments of the present invention, data packets received whose address is not found in the destination address look-up table are communicated by the terminals according to convention Ethernet protocols. Such data packets are detected by the Receive filter 622 as packets to be communicated by conventional network protocols and are stored in a section of the Receive Data FIFO 620 for such data, illustratively labeled IP RX Data FIFO.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. In a communications network susceptible to packet transmission collisions, a method for combining data packets intended for transmission toward a common communications device, comprising:
   at a switching device, receiving packets to be transmitted by the switching device toward destination communications devices;
   sorting data packets received during a predetermined time period into groups according to which communications device the received data packets are intended to be transmitted toward;
   time aligning the data packets in each of the groups using timing information associated with respective group data packets;
   applying at least one pre-selected orthogonal function to the packets in each group, thereby orthogonally combining the sorted and time aligned data packets within each of the groups associated with a common communications device; and
   transmitting, toward respective destination communications devices and under respective headers, the orthogonally combined packets associated with each of said groups.

2. The method of claim 1, wherein said received data packets are sorted using a MAC header of each of said received data packets.

3. The method of claim 1, wherein said received data packets are stored in different sections of a memory according to which communications device of said network the received data packets are intended.

4. The method of claim 1, further comprising sorting for transmission said orthogonally combined data packets in different sections of a memory according to which communications device said combined data packets are intended.

5. The method of claim 4, wherein said orthogonally combined data packets are stored in different sections of a memory according to which communications device of said network the combined data packets are to be transmitted.

6. The method of claim 1, wherein said orthogonally combined data packets are transmitted to an intended receiver using a single MAC header.

7. The method of claim 1, wherein a respective bandwidth required to transmit each group of said orthogonally combined data packets is substantially the same as a bandwidth required to transmit a largest data packet in each of said groups.

8. The method of claim 1, wherein said timing information comprises a time period greater than or equal to a total time latency for receiving data packets intended for a common communications device of said network.

9. The method of claim 8, wherein data packets in said network are communicated according to a global timing schedule and said time latency is due to differences in the latencies of transmission media of the communications devices of said network.

10. The method of claim 1, wherein only data packets having specific MAC headers are orthogonally combined.

11. The method of claim 1, wherein data packets not orthogonally combined are communicated in said network according to conventional Ethernet protocols.

12. An apparatus for combining data packets intended for transmission toward a common communications device in a communications network susceptible to packet transmission collisions, comprising:
   a timer for defining a time period for receiving data packets using timing information associated with a specific group of data packets;
   an addressing device for defining a storage location for said received data packets according to which communications device the received data packets are intended to be transmitted toward;
   a memory for storing said received data packets in different sections according to the storage location defined by said addressing device, wherein the data packets stored within each of said different sections are timed aligned; and
   a combiner for applying at least one pre-selected orthogonal function to the packets in each group, thereby orthogonally combining the respective time aligned data packets in each of said different sections of said memory associated with a common communications device prior to transmission of the orthogonally combined packets associated with each of said groups under respective headers toward respective destination communications devices.

13. The apparatus of claim 12, further comprising a second memory for storing said orthogonally combined data packets in different sections according to which communications device of said network the combined data packets are to be transmitted.

14. The apparatus of claim 12, further comprising a bit scaler for defining the number of bits to be combined by said combiner.

15. The apparatus of claim 12, wherein said addressing device stores information regarding the MAC header of which data packets are to be orthogonally combined.

16. The apparatus of claim 12, further comprising a Receive MAC for receiving data packets and a Transmit MAC for transmitting the respective orthogonally combined data packets to an intended communications device.

17. The apparatus of claim 12, wherein said apparatus is implemented in an interconnect switch of said network.

18. The apparatus of claim 12, wherein said apparatus is implemented in at least one of the communications devices of said network.

19. A packet network susceptible to packet transmission collisions where data packets intended for transmission toward a common communications device are combined, comprising:
- a plurality of communications devices; and
- a switch for interconnecting said communications devices, wherein said interconnection switch includes:
  - a timer for defining a time period for receiving data packets using timing information associated with a specific group of data packets
  - an addressing device for defining a storage location for said received data packets according to which communications device the received data packets are intended to be transmitted toward;
  - a memory for storing said received data packets in different sections according to the storage location defined by said addressing device, wherein the data packets stored within each of said different sections associated with a common communications device are respectively timed aligned; and
  - a combiner for applying at least one pre-selected orthogonal function, thereby orthogonally combining the respective time aligned data packets in each of said different sections of said memory associated with a common communications device prior to transmission of the orthogonally combined packets associated with each of said groups under respective headers toward respective destination communications devices.

20. A packet network susceptible to packet transmission collisions where data packets intended for transmission toward a common communications device are combined, comprising:
- a non-blocking switch for interconnecting communications devices of said network; and
- a plurality of communications devices, wherein at least one of said communications devices includes:
  - a timer for defining a time period for receiving data packets using timing information associated with a specific group of data packets;
  - an addressing device for defining a storage location for said received data packets according to which communications device the received data packets are intended to be transmitted toward;
  - a memory for storing said received data packets in different sections according to the storage location defined by said addressing device, wherein the data packets stored within each of said different sections associated with a common communications device are respectively timed aligned; and
  - a combiner for applying at least one pre-selected orthogonal function, thereby orthogonally combining the respective time aligned data packets in each of said different sections of said memory associated with a common communications device prior to transmission of the orthogonally combined packets associated with each of said groups under respective headers toward respective destination communications devices.

21. The method of claim 1, wherein said timing information comprises a time period determined using a global timing schedule according to which data packets are transmitted within said communications network and a total time latency for receiving data packets intended for a communications device of said communications network.

\* \* \* \* \*